UNITED STATES PATENT OFFICE 2,079,762

PROCESSES FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application August 21, 1936, Serial No. 97,217

8 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises estolides derived from blown oils of the particular kind hereinafter described.

It has long been known that various animal, vegetable and marine oils can be blown or oxidized so as to yield materials which differ in chemical and physical properties and characteristics from the parent materials from which they were derived. The oxidation process is generally conducted by means of moist or dry air, ozone, ozonized air, or a mixture of the same. It may be conducted at atmospheric pressure, or may be conducted under increased pressures of several atmospheres or more. Oxidation may be conducted at relatively low temperatures, for instance, 100° C., or may be conducted at a much higher temperature, such as 175° to 225° C. Oxidation may be conducted in absence of catalysts or in presence of catalysts. Such catalysts may consist of metallic salts, such as cobalt or manganese oleate, or may consist of organic material, such as alpha pinene or the like. Oxidation may be conducted in a short time, such as 20 hours or more, or may require 200 hours.

Blown or oxidized oils have been employed in the demulsification of crude petroleum emulsions either alone or after admixture with other suitable demulsifiers. We have found that if blown oils of the conventional types, and more especially, of the kind particularly suitable for demulsification of petroleum emulsions, are saponified by acid treatment and so treated as to yield a corresponding estolide, that the estolides so obtained are effective demulsifiers, and in many instances, are more effective than the parent blown oils themselves.

When the glyceride of a hydroxy fatty acid such as hydroxystearic acid, for example, is subjected to hydrolytic cleavage (Twitchell saponification), it is known that the fatty acids re-esterify intermolecularly. The carboxyl of one molecule combines with a hydroxyl of another, and the reaction leads to the formation of compounds of higher molecular weight. These materials are termed "estolides". (See "Chemistry of Synthetic Resins", vol. 2, Ellis, p. 1221, (1935)).

The blown or oxidized oils employed in demulsification of petroleum emulsions are generally selected from the unsaturated animal and vegetable oils of the non-drying type, or the semi-drying type, including the marine oils, such as marine mammal oils, etc., but rarely from the active drying oils, such as linseed oil and perilla oil. Although glycerides of saturated acids, such as stearin or palmitin, may be oxidized, such blown materials are rarely employed in producing demulsifying agents. Oxidation of the active drying oils, such as linseed oil or perilla oil, is generally apt to yield a solid or almost solid product, and as a result, demulsifying agents are rarely produced from such materials alone, but may be produced from a mixture of oils containing some proportion of such active drying oils. In actual practice, blown oils of the kind employed in demulsification of petroleum emulsions are derived from castor oil, rapeseed oil, cottonseed oil, peanut oil, corn oil, olive oil, and various marine oils, such as sardine, herring, menhaden and pilchard oil.

When an unsaturated fatty acid or oil, for instance, olive oil, is blown or oxidized with air, hydroxyl groups are formed at the ethylene linkage. This is particularly true if oxidation is carried out with moist air. It is believed that oxygen is first absorbed so as to saturate the ethylene linkage, and that further reaction takes place with water to produce two hydroxyl groups. Whether or not this is the correct explanation, it is known that hydroxyl groups are formed. For instance, "Chemistry of the Oil Industry", by Southcombe, 1926, p. 18, in speaking of blown (oxidized) oils, states as follows:

"Hydroxyl groups are unquestionably formed, as the considerable rise in acetyl value proves".

Patents which describe conventional blown oils or conventional methods of making various blown oils for various purposes, (including in some instances, for the purpose of demulsifying crude oils), include the following:

Patent No. 1,929,399, dated October 3, 1933, to Fuchs, Patent No. 1,969,387, dated August 7, 1934, to Tumbler, Patent No. 2,023,979, dated December 10, 1935, to Stehr, Patent No. 2,041,729, dated May 26, 1936, to Seymour, and Patent No. 1,984,633, dated December 18, 1934, to DeGroote & Keiser.

We have found that the most desirable estolides for the purpose of demulsification of petroleum emulsions are obtained from blown castor oil, blown rapeseed oil, or blown sardine oil, or a mixture of the same. Our preferred reagent is the estolide of blown castor oil. In the subsequent description, reference will be made to the estolide obtained from blown castor oil, although it should be understood that this is for the purpose of illustration only, and other estolides derived from fatty materials of the kind previously referred to or the like may be equally effective or even more effective on various emulsions.

Mild oxidation of castor oil (see "Chemical Technology and Analysis of Oils, Fats & Waxes", by Lewkowitsch, 6th Edition, vol. 2, p. 406) produces relatively small modifications in certain important chemical indices, such as the iodine value, the acetyl value, and the saponification value. If drastic oxidation takes place, either by continued mild oxidation, or by more vigorous oxidation at the very beginning of the reaction, as induced by either a higher temperature of reaction, or the presence of a catalyst, such as alpha pinene, manganese ricinoleate, etc., then one obtains an oxidized oil of characteristics which clearly indicate that drastic oxidation has taken place. These indices of drastic oxidation are a relatively low iodine value, such as 65 or less, and may be as low as 40 or thereabouts; a saponification value of 215 to 285 or thereabouts; an acetyl value of approximately 160 to 200, an increased viscosity; a specific gravity of almost 1, or even a trifle over 1 at times; and in absence of other coloring matter, a deep orange color.

Drastically oxidized castor oil can be prepared by well known methods, or such products can be purchased on the open market under various trade names, such as "blown castor oil", "bodied castor oil", "blended castor oil", "blended bodied castor oil", "processed castor oil", "oxidized castor oil", "heavy castor oil", "viscous castor oil", etc. These various names appear to be applied to drastically oxidized castor oils which are different in degree but not different in kind.

The drastically oxidized castor oil which we prefer to use in preparing the estolide employed as the demulsifying agent in the present process has the following characteristics:

| | |
|---|---|
| Acid number | 15.1 |
| Saponification number | 230.5 |
| Iodine number | 53.5 |
| Acetyl number | 164.0 |
| Hydroxyl value | 188.0 |
| Percent unsaponifiable matter | 1.1 |
| Percent nitrogen | 0.0 |
| Percent $SO_3$ | 0.0 |
| Percent ash | Trace |

Since acid saponification or hydrolytic cleavage is such a well known process, description is hardly required. The same procedure is followed as would be employed in the hydrolysis of any other fat or oil. The product is mixed with a suitable catalyst or saponifier which may be of the sulfo-aromatic fatty acid type (sulfo-naphthalene stearic acid), or may be of the Petroff type, which consists of oil-soluble petroleum sulfonates of the kind derived in the manufacture of white oil by fuming acid. Generally speaking, 2 to 3%, or even less of the saponifier, is added to the fatty material, and if the compound is then admixed with any dilute solution of acid, for instance, a 5 to 30% solution of sulfuric acid, and then subjected to the action of steam for several hours, for instance, 3 to 15 hours, after such period of time, hydrolysis is complete. In the case of blown oils, the fatty acids so liberated are hydroxy fatty acids, and as a result, intermolecular polymerization, or more properly, perhaps, esterification of the kind previously referred to takes place. The dilute acid water containing the glycerine and other substances may be withdrawn and the remaining product may be esterified or polymerized even further by heating at approximately 115° C. During such heating period it is desirable to pass a dry, inert gas, such as dry carbon dioxide, or even air through the estolide. The added oxidation by use of dry air at 115° C. or thereabouts for a relatively short period of time, for instance, 5 to 15 hours, will not materially change the characteristics of the product.

The material so obtained may still have an acid value, due to the fact that the amount of carboxylic hydrogen originally present exceeded the amount of alcoholiform hydroxyl radicals present, or else, there may still be present both alcoholiform hydroxyl radicals and carboxylic hydrogen. The product may be used without removal of the acidity. If desired, such acidity can be neutralized by the use of any of the conventional bases, such as caustic soda, caustic potash and ammonia, but is preferably removed by means of an amine, such as triethanolamine, mono-ethanolamine, amylamine, benzylamine, piperidine, etc.

In the claims, the expression "estolide" is used in its broadest sense to include the estolides in which all or part of the residual acidic hydrogen has been neutralized by one or more of the suitable bases previously mentioned, or in any equivalent manner. The acidic hydrogen can also be removed by esterification by mixing the estolide with an alcohol, such as ethyl alcohol, propyl alcohol, glycerol, ethylene glycol, and the like, and subjecting the mixture to conventional esterification processes, such as passing through dry hydrochloric acid gas at a temperature above the boiling point of water.

We are aware of the fact that oxidized ricinoleic acid or the like has been employed in the demulsification of crude oils. It is to be pointed out that the demulsifying agent employed in the present process, if derived from castor oil, is obtained by oxidizing the castor oil while still in the glyceride stage, and then subjecting the product to hydrolysis with simultaneous or subsequent re-esterification of the liberated fatty acids. The product so obtained is different from the product obtained by oxidation of ricinoleic acid. Oxidation of ricinoleic acid, for example, takes place in presence of free carboxyl radicals and in absence of the glycerol radical. Oxidation of a glyceride takes place in presence of the glycerol radical, and in absence of the free carboxyl radical.

It may be well to indicate that hydrolytic cleavage of a blown oil involves reactions other than the liberation of glycerol. It has been noted, for instance, that the blown castor oil employed to produce the preferred reagent in the present process has a saponification value of approximately 230. Such saponification value is dependent on the presence of esters involving perhaps members of the lower fatty acid series. When blown oil is subjected to acid cleavage, all or part of these lower fatty acids identified by having a Reichert Meissl value are liberated and pass into the dilute acid along with the glycerine. Subsequent esterification permits reactions to take place between certain hydroxyl-containing material which could not have taken place previously, due to the fact that such hydroxyl-containing material was previously esterified in combination with the lower fatty acids. Furthermore, during oxidation part of the glycerol radical may have been converted into some form akin to an aldehydic form, and thus, in any instance, the amount of glycerol liberated is less, as a rule, than the theoretical amount of glycerol, in combination with the original fatty material which was subjected to oxidation. For these reasons, as well as others, it is apparent that the estolides of the kind herein described are different from the parent blown oils from which they were derived, and also are different from the blown oils which would be obtainable by first splitting the parent oils and then subjecting the corresponding fatty acids to oxidation.

As previously remarked, it is our preference to subject a blown castor oil of the kind previously described to acid saponification so as to liberate all or substantially all the unchanged glycerol radical which would still be present in the form of liberated glycerol. After withdrawing the waste acid solution, the fatty material is heated for approximately five hours at 115° C. while passing dry carbon dioxide gas or dry flue gas through the mass. Triethanolamine is then added to the product until it is alkaline to phenolphthalein indicator. The viscosity of the material is then reduced by the addition of 25% of an added solvent. Such added solvent is selected from the following materials: denatured alcohol, benzene, water, kerosene, or a mixture of the same.

Conventional demulsifying agents employed in the treatment of oil field emulsions are used as such, or after dilution with any suitable solvent, such as water; petroleum hydrocarbons, such as gasoline, kerosene stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practicing our process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, we have found that for an average petroleum emulsion a ratio of 1 part of treating agent to 5,000 or 10,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent comprising an estolide derived from a blown oil, said blown oil being obtained from an unsaturated fatty glyceride as the parent material.

2. A process for breaking petroleum emulsions of the water-in-oil type, which consists in subjecting the emulsion to the action of a demulsifying agent comprising an estolide derived from blown rapeseed oil.

3. A process for breaking petroleum emulsions of the water-in-oil- type, which consists in subjecting the emulsion to the action of a demulsifying agent comprising an estolide derived from blown marine oil.

4. A process for breaking petroleum emulsions of the water-in-oil type, which consists in subjecting the emulsion to the action of a demulsifying agent comprising an estolide derived from blown castor oil.

5. A process for breaking petroleum emulsions of the water-in-oil type, which consists in subjecting the emulsion to the action of a demulsifying agent comprising an estolide derived from blown castor oil in which the free carboxylic hydrogen has been neutralized.

6. A process for breaking petroleum emulsions of the water-in-oil type, which consists in subjecting the emulsion to the action of a demulsifying agent comprising an estolide derived from blown castor oil in which the free carboxylic hydrogen has been neutralized with a suitable amine.

7. A process for breaking petroleum emulsions of the water-in-oil type, which consists in subjecting the emulsion to the action of a demulsifying agent comprising an estolide derived from blown castor oil in which the free carboxylic hydrogen has been neutralized with triethanolamine.

8. A process for breaking petroleum emulsions of the water-in-oil type, which consists in subjecting the emulsion to the action of a demulsifying agent comprising an estolide derived from blown castor oil in which the free carboxylic hydrogen has been neutralized with triethanolamine and diluted with a suitable solvent.

MELVIN DE GROOTE.
BERNHARD KEISER.